June 13, 1944.   E. E. CLARK   2,351,403
SHOCK CORD INSTALLATION TOOL
Filed June 29, 1943
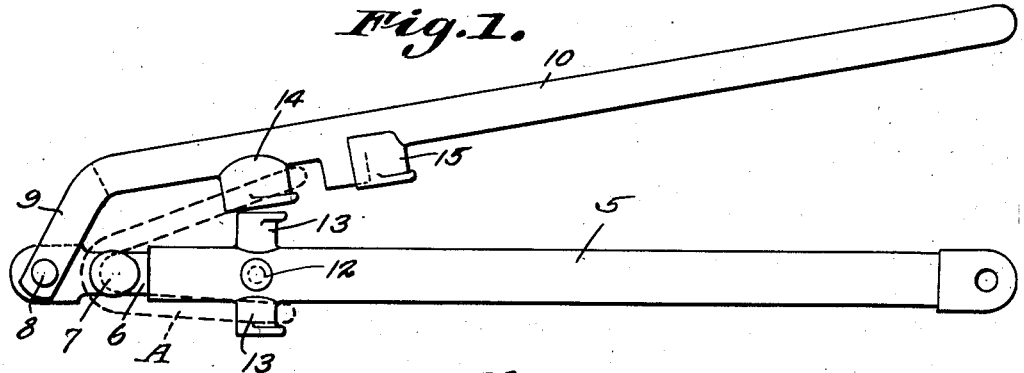
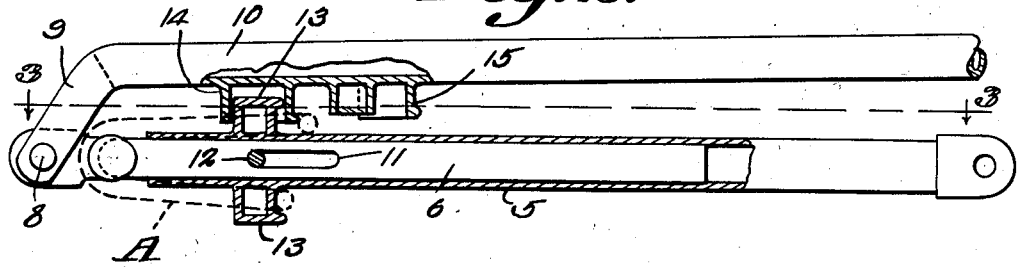
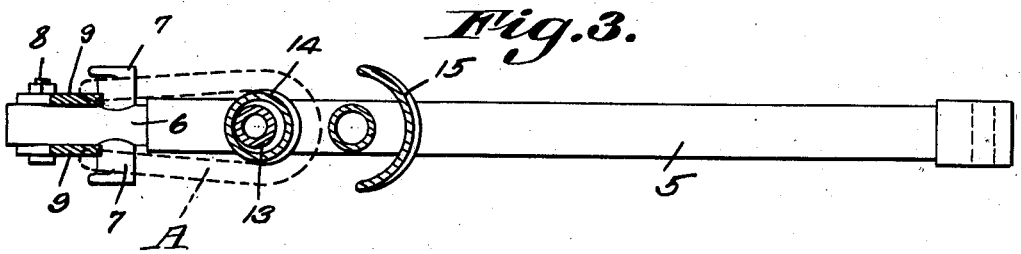
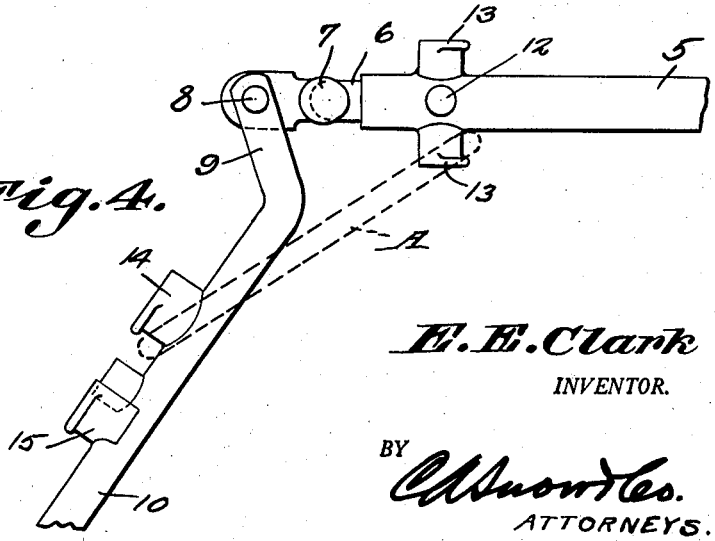
E. E. Clark
INVENTOR.
BY
ATTORNEYS.

Patented June 13, 1944

2,351,403

UNITED STATES PATENT OFFICE 2,351,403

SHOCK CORD INSTALLATION TOOL

Ernest E. Clark, Lubbock, Tex.

Application June 29, 1943, Serial No. 492,763

3 Claims. (Cl. 29—84)

This invention relates to a tool designed for use in installing shock cords on shock struts of airplane landing gear.

An important object of the invention is to provide a tool to which a shock strut may be secured, the tool having means whereby the usual shock cord of an airplane landing gear, may be positioned thereon and stretched in position by the operation of the tool to bring one end of the shock cord to a position directly over the shock cord lug of the shock strut.

Another important object of the invention is to provide a tool which will uniformly stretch the cord at both sides, to insure an even operation of the shock strut supplied with the cord.

Still another object of the invention is to provide a stretching device of this character which will not mar or damage the shock cord, when it is placed under tension and applied to the shock strut.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view of the shock cord stretching and installation tool, constructed in accordance with the invention, the shock cord being shown in dotted lines.

Figure 2 is a side elevational view partly in section, illustrating the instrument as moved to a position whereby the shock cord may be transferred to the shock cord lug of the shock strut of the airplane.

Figure 3 is a sectional view taken on line 3—3 of Figure 2.

Figure 4 is a fragmental elevation view, illustrating the position of the tool with respect to the shock strut, during the positioning of the shock cord on the tool and strut.

Referring to the drawing in detail, the reference character 5 indicates a shock strut of an airplane landing gear, the strut being of the usual and well known construction. As shown, the strut includes an outer tubular member, and an inner movable member or rod 6, the rod 6 being formed with a transverse lug 7 over which the shock cord, indicated by the reference character A, and shown in dotted lines, is stretched. The lugs 7 are spaced from the outer end of the inner movable member or rod 6. An opening is formed adjacent to the outer end of the inner movable member 6, for the reception of the bolt 8 that extends through openings in the forked end 9 of the tool, indicated at 10, thereby pivotally connecting the tool with the shock strut. The member 6 is formed with an elongated opening indicated at 11, which opening accommodates a transversely disposed pin 12, that is connected with the tubular section of the strut, so that movement of the member 6 within the tubular section of the strut, will be permitted.

Lugs 13 extend vertically from the tubular section of the shock strut, as clearly shown by the drawing, and provide means over which the ends of the shock cord are positioned for restricting movement of the inner member 6, with respect to the tubular section of the shock strut.

Formed on one side of the tool 10, is a hollow extension 14 which is so disposed that it will move over the uppermost lug 13 of the shock strut, housing the lug 13, as shown by Fig. 2. When the shock cord is to be stretched over the lugs of the shock strut, the shock cord is positioned so that one end thereof will fit over the lowermost lug 13. The opposite end of the shock cord is now positioned over the hollow extension 14, as shown by Fig. 4. The tool 10 is now swung upwardly to the position shown by Fig. 2, whereupon the shock cord may be slid from the extension 14 to a position over the uppermost lug 13. The shock strut may now be replaced on the airplane running gear.

Formed on the tool 10, are lugs 15 which are so arranged that they will fall directly over lugs of a shock strut of another type of airplane, wherein lugs corresponding to the lugs 13 shown on the strut illustrated in the drawing, are disposed directly under the lugs 15. Thus the tool may be used for stretching and positioning shock cords on various types of airplane landing gear.

It will of course be understood that the shock strut which is to be supplied with the shock cord, is removed from the landing gear of the airplane, and the instrument 10 is positioned thereon, by connecting one end of the tool to the strut. After the shock cord has been properly positioned and stretched on the shock strut, the tool or instrument 10 is removed, and the shock strut replaced in the landing gear.

In view of the foregoing detailed disclosure, it is believed that a further explanation as to the use of the instrument is unnecessary.

What is claimed is:

1. A tool adapted for use in stretching and positioning shock cords on airplane landing gear including shock struts having upper, lower and transverse shock cord lugs, comprising a lever, means at one end of the lever for pivotally connecting the same to one end of the shock strut, a lug fixed to and spaced from said end of the lever and adapted to hold one end of a shock cord looped thereover, the shock cord being also looped over the lower lug of the strut, situated on one side of the strut, said lever adapted to be swung upwardly to a position in extended alignment with the shock strut, and downwardly on the other side of the strut, whereby the intermediate portion of the shock cord is stretched over the transverse lugs of the strut, and the end of the shock cord that is looped over the lug of the lever is brought directly over the upper lug of the shock strut situated on the other side thereof, to be transferred to said upper lug of the strut.

2. A tool adapted for use in stretching and positioning shock cords on airplane landing gear including shock struts having upper, lower and transverse shock cord lugs, comprising a lever, means at one end of the lever for pivotally connecting the same to one end of the shock strut, a hollow lug fixed to and spaced from said end of the lever and adapted to hold one end of a shock cord looped thereover, the shock cord being also looped over the lower lug of the strut, situated on one side of the strut, said lever adapted to be swung upwardly to a position in extended alignment with the shock strut, and downwardly on the other side of the strut, said hollow lug encasing the major portion of the upper lug of the strut, the intermediate portion of the shock cord being stretched over the transverse lug of the strut, and the end of the shock cord that is looped over the hollow lug of the lever is brought directly over the upper lug of the shock strut situated on the other side thereof, to be transferred to said upper lug of the strut.

3. A tool adapted for use in stretching and positioning shock cords on airplane landing gear including shock struts having upper, lower and transverse shock cord lugs, comprising a lever, one end of the lever being curved downwardly, means for pivotally connecting the downwardly curved end of the lever to the end of the strut, adjacent to the transverse shock cord lugs, a lug fixed to and spaced from said pivoted end of the lever and adapted to hold one end of the shock cord looped thereover, the shock cord being also looped over the lower lug of the strut, situated on one side of the strut, said lever adapted to be swung upwardly to a position in extended alignment with the shock strut, and downwardly on the other side of the strut, whereby the intermediate portion of the shock cord is stretched over the transverse lugs of the strut, and the end of the shock cord that is looped over the lug of the lever is brought directly over the upper lug of the shock strut to be transferred to said upper lug of the strut.

ERNEST E. CLARK.